Sept. 2, 1958   J. R. MADEIRA   2,850,146
ENDLESS FLEXIBLE CONVEYOR FRAME
Filed Aug. 4, 1954   5 Sheets-Sheet 1
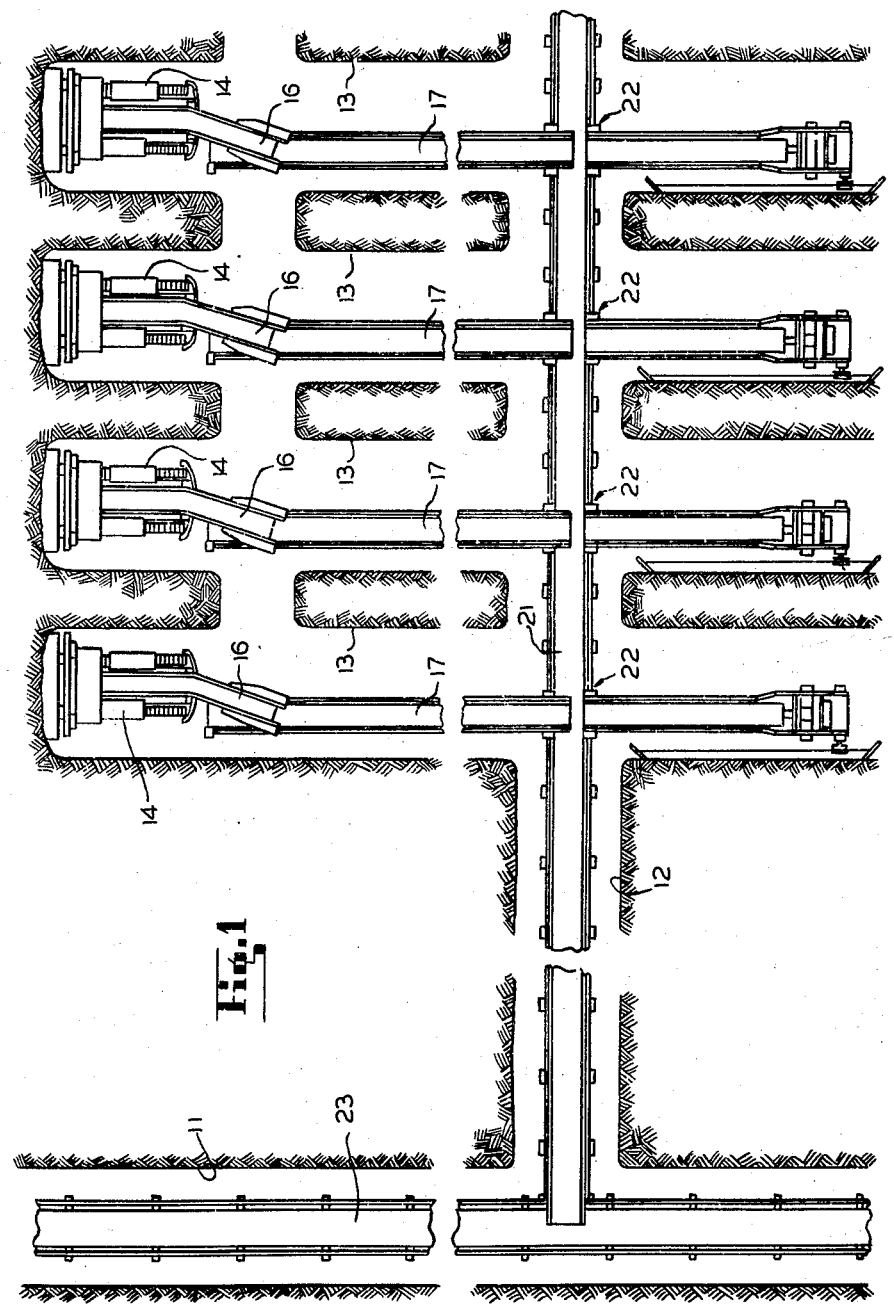
*INVENTOR.*
JOHN R. MADEIRA
BY
ATTORNEY Sept. 2, 1958
J. R. MADEIRA
2,850,146
ENDLESS FLEXIBLE CONVEYOR FRAME
Filed Aug. 4, 1954
5 Sheets-Sheet 2
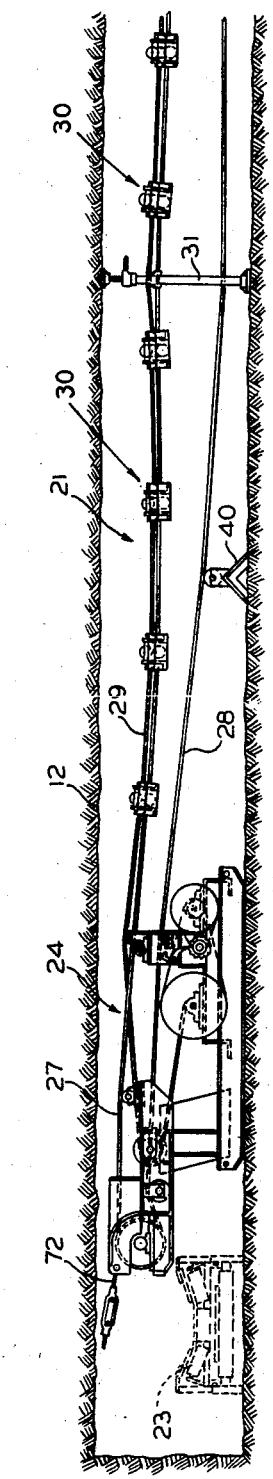
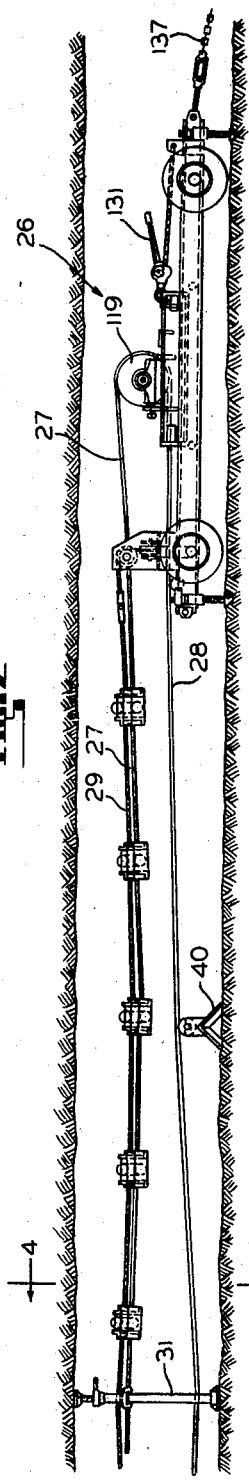
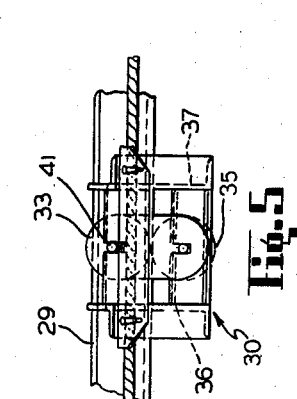
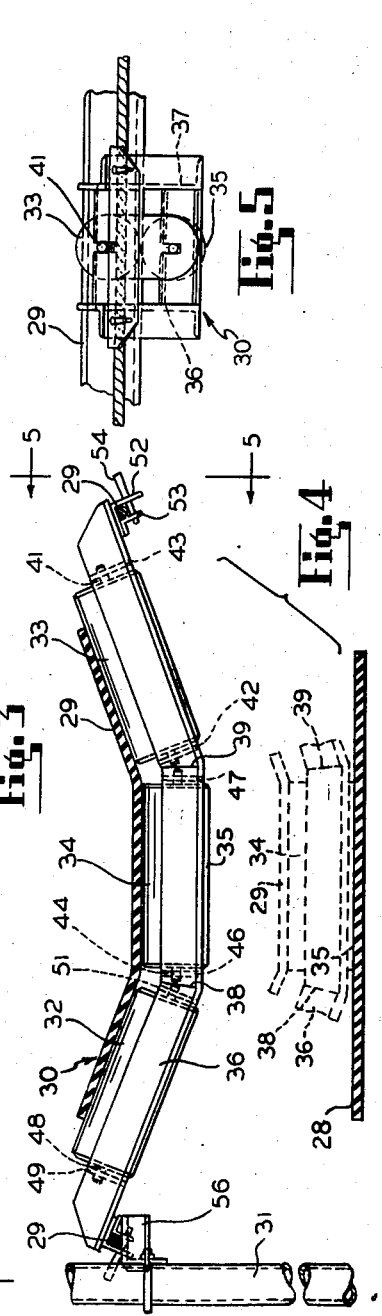
INVENTOR.
JOHN R. MADEIRA
BY
Murray A. Gleeson
ATTORNEY

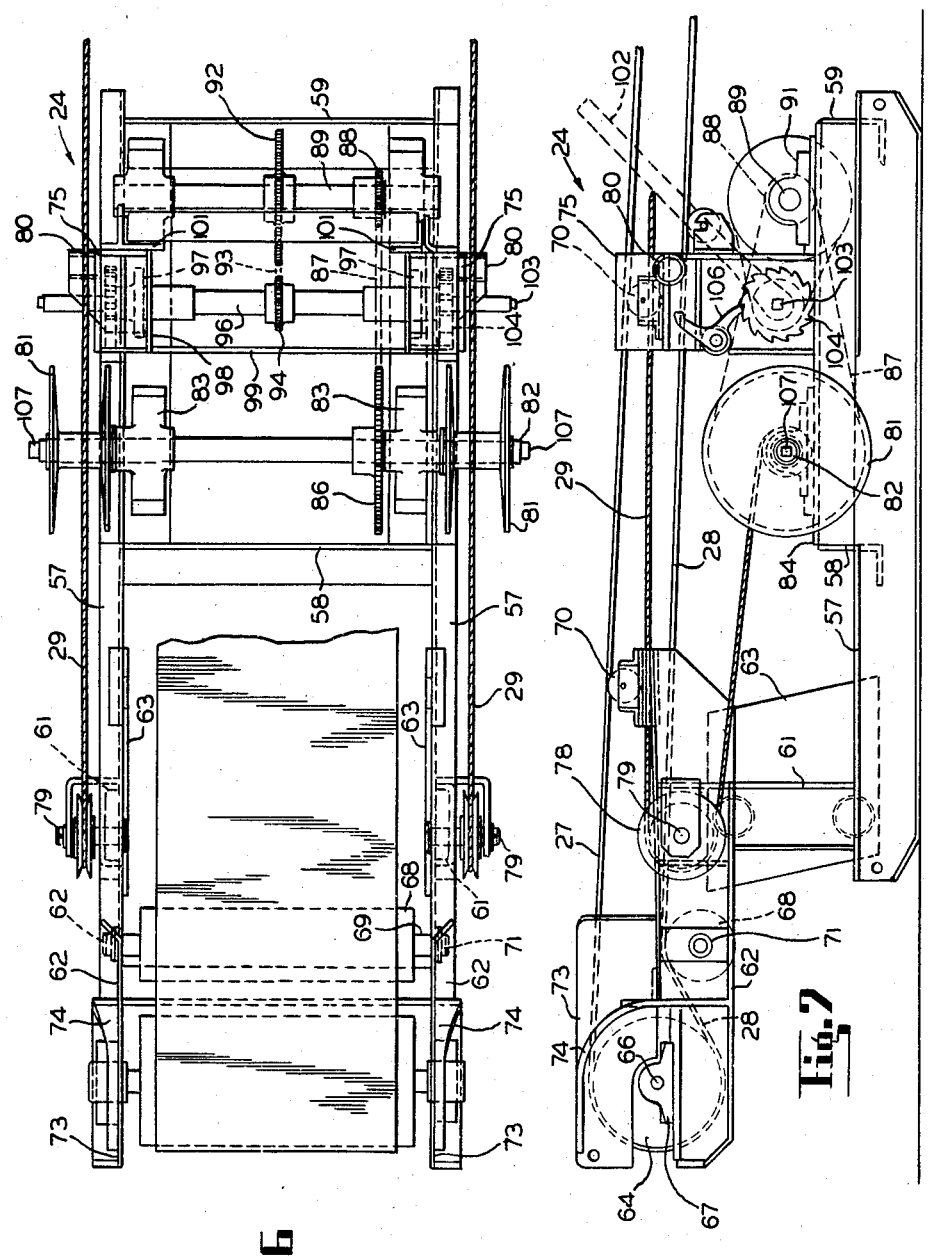

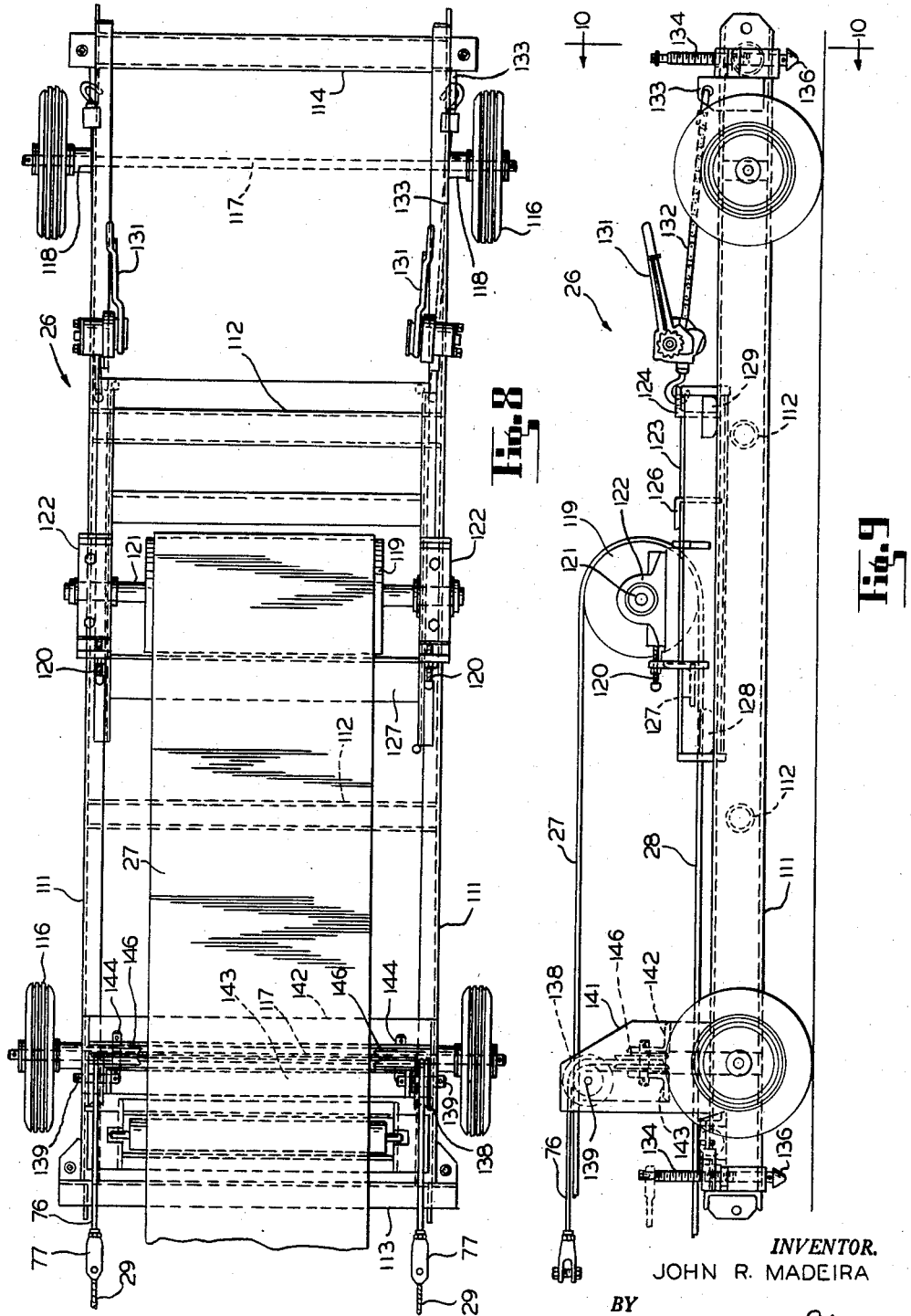

Sept. 2, 1958     J. R. MADEIRA     2,850,146
ENDLESS FLEXIBLE CONVEYOR FRAME

Filed Aug. 4, 1954     5 Sheets-Sheet 5

INVENTOR.
JOHN R. MADEIRA
BY
*Murray Q. Gleeson*
ATTORNEY

United States Patent Office 2,850,146
Patented Sept. 2, 1958

2,850,146

ENDLESS FLEXIBLE CONVEYOR FRAME

John R. Madeira, Chicago, Ill., assignor to Goodman Manufacturing Company, Chicago, Ill., a corporation of Illinois Application August 4, 1954, Serial No. 447,769

15 Claims. (Cl. 198—109)

This invention relates generally to conveyors and more particularly to an improved portable conveyor especially adapted for use in a coal mine or the like.

One of the principal objects of the invention is to provide an improved belt conveyor characterized by simplicity in the setting up thereof, and also by ready portability in a mine or the like.

Another object is to provide an endless conveyor characterized by a pair of cables suspended as catenaries on spaced roof jacks or the like, and providing a means for supporting the conveying reach of such endless conveyor, the supporting cables being capable of being stored during disassembly of the conveyor, and being readily placed in operable position upon a subsequent set-up of the conveyor.

A still further object of this invention is to provide an improved endless belt conveyor which is readily and easily disassembled and moved from one location to another location where the conveyor is easily reassembled. Further, when the improved endless belt conveyor, according to the present invention, is positioned at a location it is extensible and retractable with a minimum amount of effort.

It is an additional object of this invention to support the load carrying reach of an endless belt conveyor independently and separately from the return reach thereof.

A still further additional object of this invention is to separately and independently support the conveying and return reaches of an endless conveyor belt so that the supporting means for the conveying reach may, under abnormal loads, deflect into engagement with the return reach of the belt conveyor so that additional supplemental support may be given to the conveying reach thereof when the conveying reach is placed under an excessive abnormal loaded condition.

The conveyor according to the present invention is especially adapted for use with continuous mining equipment, and greatly reduces the time necessary for setting up in accordance with the advance of such equipment.

Other objects and important features of the invention will be apparent from a study of the following specification taken with the drawings which together illustrate a preferred embodiment of the invention and what is now considered to be the best mode of practicing the principles thereof. Other embodiments of the invention may be suggested to those having the benefit of the teachings herein, and it is therefore intended that the scope of the invention not be limited by the precise embodiment herein shown, such other embodiments being intended to be reserved especially as they fall within the scope and purview of the claims subjoined.

In the drawings:

Fig. 1 is a schematic plan view of a mine wherein the operations are carried on by the room and pillar method, and employing an improved conveyor according to the present invention in connection with such method;

Fig. 2 is an elevation view of a portion of the conveyor according to the present invention, the outby or discharge unit thereof being shown in this view;

Fig. 3 is an elevation view similar to Fig. 2, and showing the inby unit thereof;

Figure 10:
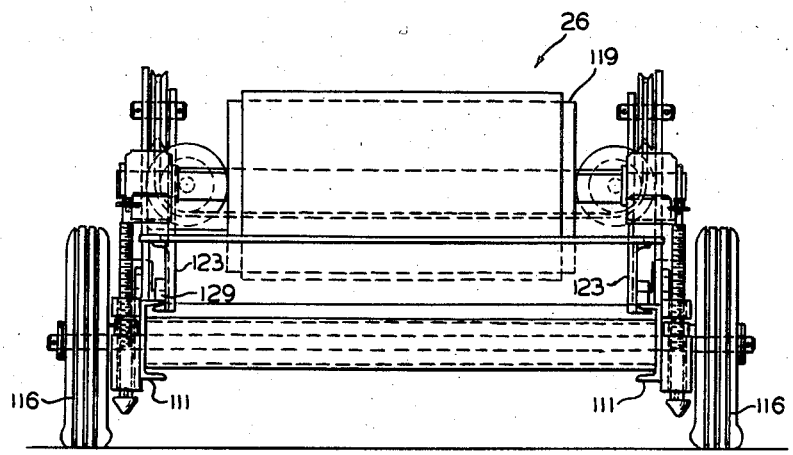

Fig. 4 is an enlarged elevation view of one of the idler troughing roller assemblies for the conveyor shown in Figs. 2 and 3, said view being taken along the line 4—4 of Fig. 3 and looking in the direction of the arrows and illustrating, in dotted lines, the downward deflection of the idler troughing roller assembly, into engagement with the return reach of the conveyor belt, as may occur under an excessive abnormal load;

Fig. 5 is a partial end view of the troughing roller assembly shown in Fig. 4, said view being taken along the line 5—5 of Fig. 4 and looking in the direction of the arrows;

Fig. 6 is an enlarged scale plan view of the outby or discharge unit shown in Fig. 2;

Fig. 7 is an elevation view thereof;

Fig. 8 is an enlarged scale plan view of the inby unit of the conveyor seen in Fig. 3;

Fig. 9 is an elevation view thereof; and

Fig. 10 is an end elevation view of such inby unit taken along the line 10—10 of Fig. 9 and looking in the direction of the arrows.

Referring now particularly to Fig. 1 of the drawings there is shown a mine having a main entry 11 which is intersected by a cross entry 12. Such a cross entry 12 may be intersected by one or more rooms 13, in which each such room the mining operation is carried on by a continuous method. Each of the rooms 13 accordingly has disposed therein a continuous miner 14 of the type as shown in Robbins, U. S. Patent No. 2,705,624, entitled Coal Mining Machine, which cuts a pair of overlapping contiguous bores in the seam or vein.

Such miners are provided with a discharge boom 16 arranged to discharge the cuttings from the seam or vein upon a shuttle conveyor 17 which may be of the type as shown in an application of Richard P. Boersma, Serial No. 451,401, filed August 23, 1954, for Shuttle Conveyor and Transfer Station Therefor. Such a shuttle conveyor is preferably of the type which is advanced into the room 13 behind the miner 14 in accordance with its advance.

The cross entry 12 has mounted therein a cross entry conveyor 21 according to the present invention arranged to receive material conveyed by the shuttle conveyor 17 at a transfer or tripper station 22 disclosed in the aforesaid Boersma application. The cross entry conveyor 21 is arranged to discharge the contents carried thereon upon a mother belt conveyor 23 disposed in the main entry 11.

Referring now particularly to Figs. 2 and 3 of the drawings the improved conveyor 21 according to the present invention consists of an outby unit referred to generally by the reference numeral 24 and an inby unit, see Fig. 3, referred to generally by the reference numeral 26. The outby unit 24 is arranged to drive an endless belt having a conveying reach 27 and a lower or return reach 28. The reaches 27 and 28 of the endless conveyor are reversed in direction at the inby unit 26 as seen in Fig. 3.

The outby unit 24 and the inby unit 26 affords support at each end for a pair of cables 29. The cables 29 are supported at intervals throughout their length by means of spaced roof jacks 31 which are spaced throughout the length of the cross entry 12, so that the cables 29 are suspended between such roof jacks 31 substantially as catenaries.

The upper reach 27 is supported at spaced intervals intermediate the outby unit 24 and the inby unit 26 upon troughing roller assemblies, referred to generally by the reference numeral 30, which are also spaced from the jacks 31. Each of the troughing roller assemblies 30 comprise inclined troughing rollers 32 and 33 and a center load supporting roller 34. As seen in Figs. 4 and 5, these rollers are supported between spaced angles 36 and 37 which are mitered at their ends and welded together at welds 38 and 39 to the contour shown. The roller 33 is mounted to turn freely upon a shaft 41 supported at each end in webs 42 and 43 spanning the distance between the angles 36 and 37. The load supporting roller 34 is likewise arranged to turn upon a shaft 44 supported at each end in web members 46 and 47 and spans the distance between the angle members 36 and 37 with the lower portion 35 of the load supporting roller 34 extending below the angles 36 and 37, for a purpose to be more fully disclosed hereinafter. The inclined roller 32 also is provided with a shaft 48, the ends of which are supported in web members 49 and 51 likewise spanning the distance between the angles 36 and 37.

As seen particularly in Figs. 4 and 5 the outer ends of the angle members 36 and 37 are spanned by angles 52 and 53. The angles 52 and 53 have their legs extending in such a fashion as to embrace the support cables 29, and are drilled to receive a drift pin 54 which firmly clamps the troughing roller assembly to the cables 29.

As seen also in Fig. 4 the jack 31 has a shoe or support 56 extending inwardly therefrom forming a support for the cable 29 intermediate such troughing roller assemblies 30.

As seen in Figs. 2 and 3, the return reach 28 is supported at intervals upon return idler roller assemblies, indicated generally by the reference numeral 40, which are each separate from and independent of the troughing roller assemblies 30 and positioned adjacently therebelow. These are readily portable and rest upon the floor of the cross entry 12 in the manner shown.

As illustrated in Figs. 4 and 5, the load supporting roller 34 has the lower portion 35 thereof extending below the angles 36 and 37 and when an excessive abnormal large load condition or a sudden impact load condition is placed on the upper or conveying reach 27 of the endless conveyor the troughing roller assemblies 30 may be deflected and displaced downwardly until the lower portion 35 of the load supporting roller 34 may engage the return reach 28, as illustrated by the dotted line of Fig. 4, to give additional supplemental flexible support to the upper reach 27 of the conveyor belt.

Referring now to Figs. 6 and 7, the outby unit 24 is mounted upon a skid formed of spaced channel members 57 resting upon the floor of the cross entry 12, and maintained in spaced relationship by angles 58 and 59 welded at their ends to the webs of the channels 57. A channel member 61 is welded to the flange of each channel 57 at the discharge end thereof. Spaced channel members 62 extend from each vertical channel 61 in the outby direction, and are spaced above the channels 67. A pair of gusset plates 63 are welded to the channels 57, 61 and 62 to stiffen the entire assembly.

The spaced channels 62 afford a support for a driving pulley 64 having a stationary shaft 66 mounted in shaft supports 67 disposed on the channels 62. The driving pulley 64 is of the type enclosing a motor and a gear train, not shown, and is arranged to reverse the upper conveying reach 27 of the conveyor belt. After such reversal, the lower or return reach 28 is guided on an idler pulley 68 mounted upon a shaft 69 supported at each end in bearings 71 on the webs of the spaced channels 62.

As seen in Fig. 7, the conveying reach 27 is supported at the outby unit 24 upon troughing roller assemblies 70, which may be similar in general contour to the troughing roller assembly 30 seen in Figs. 3 and 4.

As seen in Fig. 2 the outby unit 24 is anchored in position by means of a cable 72 connected at any convenient point in the main entry 11 above the mother belt 23. The cable 72 is anchored at the outby unit 24 to a plate 73 extending upward from each channel 62, and such plates 73 may each be provided with a stiffening rib 74 as seen in Figs. 6 and 7.

As will be described in further detail as this specification proceeds the cables 29 are arranged to be equalized in their stress by means of being connected to a cable length 76 at the inby unit 26, see Figs. 8, 9 and 10, at a fitting 77. When disconnected from the fitting 77, the cables 29 are stored after dismantling the endless conveyor 21, and to this end each of the cables 29 is arranged to be trained over an idler sheave 78 supported upon a stub shaft 79 extending from the channels 62 as seen in Figs. 6 and 7, the cable 29 then being wound upon a drum 81. Said drum is made fast to a shaft 82 supported in a pillow block 83 resting upon a plate 84 which spans the distance between the angles 58 and 59.

The cables 29 are arranged to be wound around the drums 81 by means of a power train including a sprocket 86 fast to the shaft 82 and having a sprocket chain 87 trained therearound, which sprocket chain 87 in turn is trained about a sprocket 88 mounted fast to a shaft 89. Said shaft is likewise mounted upon pillow blocks 91 disposed on the plate 84, and the shaft 89 has a sprocket 92 cooperating with a sprocket chain 93 trained about a sprocket 94 fast to a shaft 96. Said shaft 96 is supported in bearings 97 extending from a vertical plate 98 welded to a plate 99 spanning the distance between the channels 57 and stiffener plates 101 extending inward from the plate 84.

Power for turning the shafts 96 and 89 to drive the drums 81 is provided by means of a crank 102 fitted to a square hub 103 on the shaft 96. The shaft 96 is also provided with a ratchet wheel 104 which cooperates with a pawl 106 to prevent retrograde movement of the shaft 96, and to maintain the desired degree of tension upon the cables 29 at all times.

However, when it is desired to wind the cables 29 upon the drums 81 for storage of the cable thereon the crank 102 is fitted about a square hub 107 upon the ends of the shaft 82. It will be seen that the drums 81 may be turned directly without the need of the power train described for storage of the cable 29 thereon, and that the drums 81 may be turned by such power train for the purpose of placing tension on the cable 29.

The correct alignment of the cables 29 with respect to the outby unit 24 and the inby unit 26 is determined by guide plates 75 spaced from the cables 29 and flanking the same. These plates have a support 80 for each cable extending therefrom, and correct alignment of the outby unit 24 will be had when the cables 29 are parallel to the plates 75 and equally spaced therefrom.

Referring now to Figs. 8, 9 and 10 of the drawings, the inby unit 26 consists of a pair of laterally spaced longitudinal frame members 111 which are spanned by tubular stiffening members 112 and opposed end channel members 113 and 114. The frame thus far described is mounted upon wheels 116 turning upon a transverse shaft 117 supported upon bearings 118 on the spaced frame members 111.

As seen in Fig. 9, the upper or conveying reach 27 is reversed in direction about an idler pulley 119 turning upon a shaft 121 mounted in supports 122. Adjusting means 120 are provided to align the idler pulley 119 so that its axis of rotation is perpendicular to the longitudinal axis of the conveying reach 27.

The idler pulley 119 together with the shaft 121 and the standards 122 is arranged to move on a carriage comprising a pair of channels 123, see Fig. 10, which are spaced inwardly of the channels 111 and have their flanges in interlocking engagement with the flanges of channels 111. The channel members 123 are spanned by angle members 124, 126 and 127. The web of the channels 123 have fixed thereto shoes 128 and 129 which ride upon the upper flange of the channels 111.

The entire carriage thus far described is connected to a pair of hand operated ratchet type winches referred to generally by the reference numeral 131 by a chain 132 which is anchored to an abutment 133 adjacent the lateral brace 114 at the inby end of the inby unit 26.

The inby unit 26 is provided with screw type jacks 134 at each corner thereof whereby the wheels 116 may be raised from the ground, as seen in Fig. 3, each of the screw type jacks 134 having tapered shoes 136 at the lower end thereof arranged to grip the mine floor. As seen also in Fig. 3, the inby unit 26 is arranged to be anchored against movement by means of a cable or chain 137, which is anchored at any convenient point within the cross entry 12.

The cables 29 supporting the endless conveyor are connected to the flexible strand 76 which is guided over a pair of sheaves 138, each mounted upon horizontal stub shafts 139 extending inwardly from a standard 141 extending upward from the top flange of the channel members 111. The two standards 141 are maintained in proper spaced relationship by means of angle members 142 and 143 spanning the distance therebetween, and having vertical leg affording supports for laterally spaced pin shafts 144, each supporting an idler sheave 146.

It will be seen that the cable 76 is guided around the sheaves 138 and 146 to reverse the direction thereof, and in so doing the tension in the support cables 29 is thereby equalized in amount.

When the inby unit 26 has been moved to its proper position so as to place the support cable 29 in position to support the upper run 27 of the conveyor belt, proper tension may be placed upon the conveyor belt 27 by means of the ratchet type winches 131. Proper tension upon the support cables 29 is achieved at the outby unit 24 by winding of the support cable 29 upon the drums 81.

It is believed apparent that the structure according to the present invention presents a number of advantages not to be found in the structures of the prior art. By the use of a pair of support cables which are maintained in parallelism by the outby and inby units, the endless belt may be readily trained over the idler roller assemblies supported on the cables, and both the driving pulley 64 at the outby unit 24 and the tail pulley 119 at the inby unit 26 may be properly oriented with respect to the support cables so as to prevent misalignment of the belt.

It is believed obvious, also, that the entire structure may be rapidly disassembled to be moved into another cross entry in accordance with the advance of the continuous miners 14 disposed in the rooms 13. In such transport, the endless belt can be opened at its lacing, rolled up, and transported readily by the mother belt conveyor 23. After the outby unit 24 has stored its support cables 29 upon the drums 81 it likewise may be readily transported within the mine. The inby unit 26 can readily be disconnected from its point of anchorage within the mine, lowered upon its wheels, and then readily be moved to another cross entry within the mine.

While the invention has been described in terms of a preferred embodiment its scope is not intended to be limited by the precise embodiment herein shown no otherwise than by the scope of the herein appended claims.

I claim as my invention:

1. A flexible frame conveyor comprising a pair of laterally spaced flexible strands extending between and having the end portions thereof carried respectively at an inby and an outby unit, said units being relatively movable with respect to each other in a direction substantially longitudinal of said strands to a plurality of relatively fixed positions, at least one troughing assembly extending between said strands intermediate the units, an endless conveyor belt carried by said troughing assembly and trained about said units for orbital movement therebetween, means for tensioning the belt in accordance with the relative positioning of the units, strand storage means carried by one of said units for effectively storing the flexible strands in accordance with the relative positioning of the units at a selected fixed position, and strand tensioning means acting through said strand storage means for effectively applying predetermined tension to said strands.

2. The flexible frame conveyor as set forth in claim 1, wherein the outby unit is fixed and said inby unit is movable relative to the outby unit to the plurality of fixed positions.

3. The structure as set forth in claim 1, wherein said strand storage means comprises winch means for storing the flexible strands and paying out or taking up same in accordance with the relative distance between said units, power means for driving the winch means in a direction to apply effective belt supporting tension on the strands, and strand guide means carried by said units for effectively transmitting belt supporting tension from the winch means to the portion of the strands intermediate said units.

4. The structure as set forth in claim 3 wherein the winch means, power means and strand guide means are combined in the said one unit.

5. A flexible frame conveyor comprising a pair of laterally spaced flexible strands trained between an inby and an outby unit, said units being relatively movable with respect to each other in a direction substantially longitudinally of said strands to a plurality of relatively fixed positions, troughing assemblies extending between and supported by said strands at spaced longitudinal positions intermediate the units for generally vertical movement with the flexing of the strands, idler assemblies independent and separate of said troughing assemblies and being spaced along the course of said strands intermediate the units, an endless conveyor belt having a conveying reach and a return reach trained about said units for orbital movement therebetween with said conveying reach being supported and guided by the troughing assemblies and said return reach being independently supported and guided by said idler assemblies, means for tensioning the belt, strand storage means carried by one of said units for effectively storing the flexible strands in accordance with the relative positioning of the units at a selected fixed position and strand tensioning means acting through said strand storage means for effectively applying predetermined tension to said strands.

6. The structure as set forth in claim 5 wherein said idler assemblies are offset from said troughing assemblies in a direction longitudinally of said strands with the portions of the return reach beneath the troughing assemblies which are longitudinally spaced from the idler assemblies being free to flex up and down, means disposing the idler assemblies at a level enabling said troughing assemblies to clear the said portions of the return reach under normal loads and to deflect into load-bearing relationship with the said portions under abnormal heavy loads on said conveying reach, whereby the said portions of the return reach may be engaged by the troughing assemblies to furnish an auxiliary, flexible, impact-absorbing support for such abnormal heavy loads.

7. A flexible frame conveyor comprising an inby and an outby unit, one of said units being relatively fixed and the other unit being movable with respect to the said one unit to a plurality of positions spaced therefrom, a pair of laterally spaced flexible strands extending between said units, an endless conveyor belt having a conveying reach and a return reach trained about said units for orbital movement therebetween, troughing assemblies extending between said strands and secured to the respective strands at longitudinally spaced positions, said troughing assemblies supporting the conveying reach of the conveyor belt, and return support means independent and separate from said troughing assemblies supporting the return reach of said conveyor belt, said troughing assemblies having a portion thereof, which under abnormal loaded condition, may be deflected into engagement with the return reach of the conveyor belt to give supplemental support to the conveying reach.

8. The flexible frame conveyor as set forth in claim 7 wherein said return support means is supported independently of said strands.

9. A flexible frame conveyor comprising an inby and an outby unit, one of said units being relatively fixed and the other unit being movable with respect to the said one unit to a plurality of positions fixedly spaced therefrom, a pair of laterally spaced flexible strands extending between said units, an endless conveyor belt having a conveying reach and a return reach trained about said units for orbital movement therebetween, support means for supporting said strands at certain locations remote from said units, troughing roller assemblies extending between said strands and secured to the respective strands at longitudinally spaced positions remote from said certain locations, said troughing roller assemblies supporting the conveying reach of the conveyor belt, return idler means independent and separate from said troughing roller assemblies supporting the return reach of said conveyor belt, a second support means supporting said return idler means in vertically spaced relationship at a level below said troughing roller assemblies and spaced longitudinally therefrom, each of said troughing roller assemblies including a load supporting roller, which under load, may be displaced vertically downwardly and may contact the return reach of the belt at a location remote from the return idler means causing supplemental flexible support to be given to the conveying reach of the belt through the return reach, the return idler means and the second support means.

10. The flexible frame conveyor as set forth in claim 9, wherein said second support means is longitudinally spaced from said first mentioned support means.

11. A flexible frame conveyor comprising a pair of laterally spaced flexible strands, support means secured to each strand for supporting said strands in substantially parallel relation to each other, a plurality of troughing assemblies extending between and secured to said strands at longitudinally spaced positions remote from the support means, an endless conveyor belt having a conveying reach and a return reach, said troughing assemblies and strands comprising a generally vertically flexible support for the conveying reach of said belt, return structures supporting and guiding the return reach of said belt, and means supporting said return structures independent of and separate from the troughing assemblies, said troughing assemblies having a portion thereof, which under abnormal loaded condition, may be deflected into engagement with the return reach of the belt to give supplemental support to the conveying reach.

12. A flexible frame conveyor comprising a pair of laterally spaced flexible strands extending between and having the end portions thereof carried respectively by an inby and an outby unit, said units being relatively movable with respect to each other in a direction substantially longitudinal of said strands to a plurality of relatively fixed positions, at least one troughing assembly extending between said strands intermediate the units and adapted to support an endless conveyor belt for orbital movement between the units, strand storage means carried by one of said units for effectively storing the flexible strands in accordance with the relative positioning of the units at a selected fixed position, and strand tensioning means acting through said strand storage means for effectively applying predetermined tension to said strands.

13. A flexible frame conveyor comprising a pair of laterally spaced flexible strands, support means for each strand for supporting said strands in substantially parallel relationship to each other along a course, an endless conveyor belt, a vertically flexible support for the conveying reach of said belt including a plurality of troughing assemblies extending between and secured to said strands at longitudinally spaced positions thereon remote from said support means, idler structures for supporting and guiding only the return reach of said belt, and means rigidly supporting the idler structures independent of and separate from the troughing assemblies at a level adjacent and below that of the troughing assemblies and in longitudinally spaced relation thereto along said course whereby said return reach is relatively more rigidly supported than said conveying reach.

14. In a flexible frame conveyor having flexible strand means trained along a course, troughing assemblies carried by the strand means at locations thereon where said strand means is generally freely flexible to enable up and down movement of said troughing assemblies through a range of working levels which vary in accordance with a load thereon and adapted to flexibly support a conveying reach of a conveyor belt, and idler structures adapted to support a return reach of a conveyor belt, the improvement comprising, the combination with the idler structures of support means substantially rigidly supporting the idler structures independently of and separate from the troughing assemblies in longitudinally spaced relation thereto along said course at a level adjacent to and sufficiently below said range of working levels of the troughing assemblies to enable practical operating spacing between conveying and return reaches of a conveyor belt whereby a conveying reach, when supported by the troughing assemblies, is relatively more freely flexible than a return reach supported by the idler structures.

15. In a flexible frame conveyor, flexible strand means trained along a course, troughing assemblies carried by the strand means at locations thereon where said strand means is generally freely flexible and adapted to flexibly support the conveying reach of a conveyor belt for up and down movement with respect to the ground, idler structures adapted to relatively rigidly support the return reach of the conveyor belt and means rigidly supporting said idler structures with respect to the ground and independently of and in longitudinally spaced relationship along the course from the troughing assemblies at a level adjacent to and sufficiently below a working level of the troughing assemblies when loaded to enable practical operating clearance between the conveying and return reaches whereby the conveying reach of the conveyor belt, when supported by the troughing assemblies, is relatively more freely flexible than the return reach, when supported by the idler structures, and the conveying reach is deflectable, under loaded conditions, toward and independently of the return reach.

References Cited in the file of this patent

UNITED STATES PATENTS

| | | |
|---|---|---|
| 699,477 | Bee | May 6, 1902 |
| 1,651,253 | Clifford | Nov. 29, 1927 |
| 1,748,301 | McKinlay | Feb. 25, 1930 |
| 2,613,802 | Chapman | Oct. 14, 1952 |

FOREIGN PATENTS

| | | |
|---|---|---|
| 291,917 | Great Britain | June 14, 1928 |